United States Patent Office 2,857,988
Patented Oct. 28, 1958

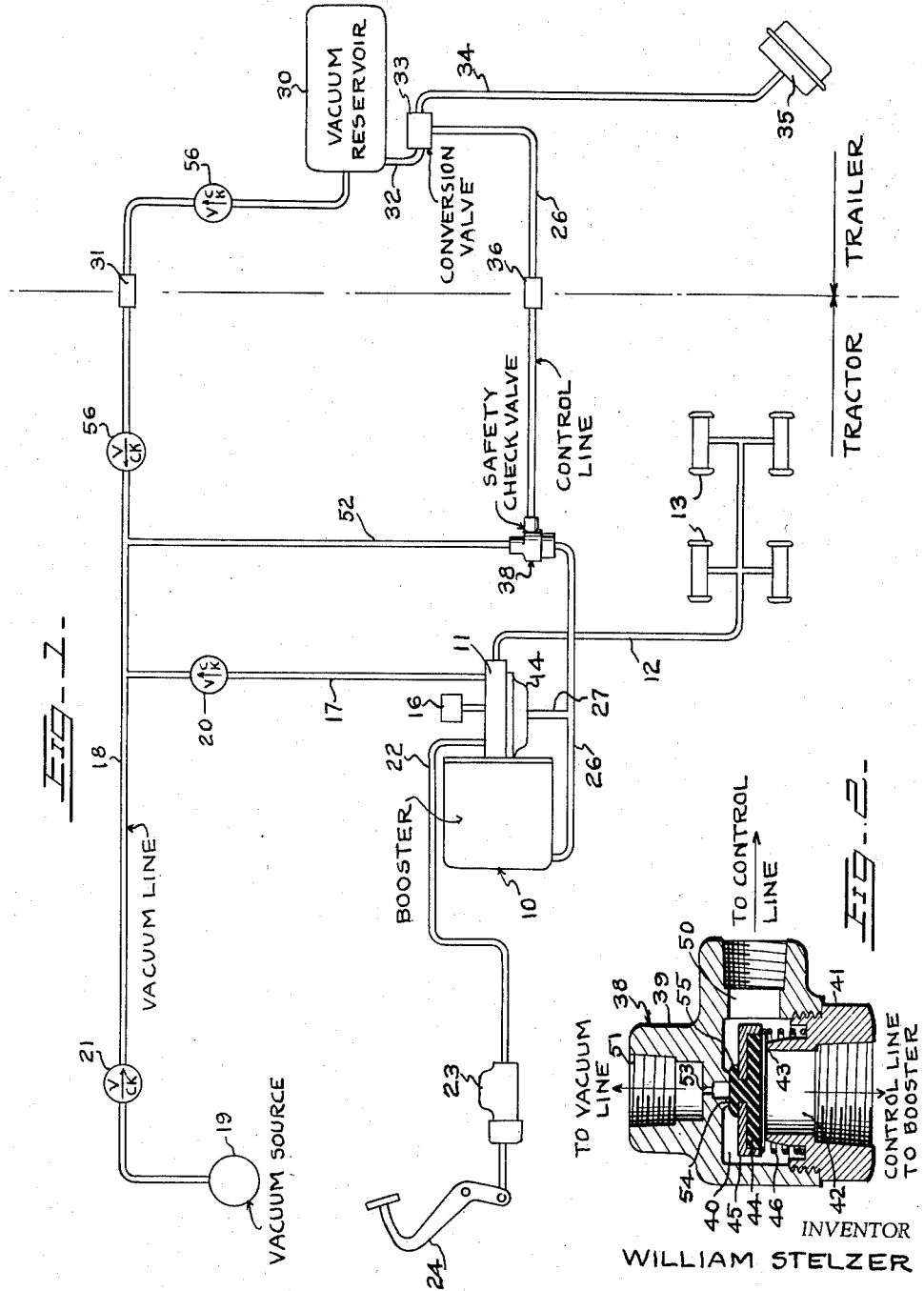

2,857,988

TRACTOR-TRAILER BRAKE SYSTEM

William Stelzer, Summit, N. J., assignor to Kelsey-Hayes Company, a corporation of Delaware Application March 19, 1956, Serial No. 572,383

14 Claims. (Cl. 188—3)

This invention relates to a tractor-trailer brake system.

It is a common practice in the brake systems of a tractor-trailer combination to provide a pedal operable booster on the tractor for applying the tractor brakes. In preferred systems, the booster comprises a booster motor of the vacuum suspended type having a valve mechanism operative by fluid displaced from a conventional master cylinder by operation of a brake pedal, the fluid thus displaced assisting in applying the tractor brakes.

In a system of the type referred to, it is further the common practice to employ a source of vacuum for the booster and to extend from such vacuum source rearwardly to the trailer a vacuum line having connection with a vacuum reservoir on the trailer. Such reservoir is connected by suitable fluid lines to vacuum operated trailer brake applying motors, and a conversion valve is interposed in such fluid lines to be operated in accordance with energization of the booster motor on the tractor. To this end, a control line is connected between the booster motor and the conversion valve. When the brake pedal is depressed to admit air into one end of the booster motor, a pressure rise occurs in the control line which operates the conversion valve to connect the vacuum reservoir to the trailer brakes. Obviously, with such an arrangement, the breaking of the control line not only admits air to the conversion valve to connect the vacuum reservoir to the trailer brake operating motors, but also admits air to the booster motor and through the valve mechanism thereof to the vacuum source. If the break in the control line is a substantial rupture, it requires only a very short time to establish atmospheric pressure conditions in the control line and also in the conversion valve and booster motor. This results in the very rapid and substantially complete automatic application of the trailer brakes.

An important object of the present invention is to provide a system of the character referred to with automatically operable means which functions, in the event of a break in the control line, to admit air to the conversion valve of the trailer, thus resulting in the application of the trailer brakes, but wherein the admission of air to the tractor booster motor is prevented, to preserve the vacuum for subsequent actuation of the tractor booster motor.

A further object is to provide such a system wherein the control line is open from end to end under normal operating conditions for the controlling of the trailer brakes in accordance with operation of the tractor booster motor, but wherein an automatic valve on the tractor closes to block off the control line and prevent the admission of air to the booster motor if a rupture occurs in the control line, or there is a break-away of the trailer, thus preserving the operativeness of the booster motor.

A further object is to provide such a system having a normally open check valve in the control line, which affords the normal functioning of the system, but wherein the check valve automatically closes upon a rupturing of the control line on the trailer or between the tractor and trailer, thus preventing the admission of air into the booster motor.

A further object is to provide an automatic valve of the type referred to in the form of a check valve biased to open position and subject to be closed when pressures in the control line rearwardly of the check valve are substantially higher than pressures forwardly of the check valve, and to provide automatic means operative upon the closing of the check valve, if such valve should close under normal conditions of operation of the brake system, to reestablish vacuum conditions in the control line rearwardly of the check valve whereby the latter will be opened.

A further object is to provide such a check valve which is supplied with two valve elements, one of which is normally open during the proper functioning of the system and the other of which is normally closed, and which other valve element is opened when the first valve element is closed, to restrictedly connect the rear end of the control line to a source of vacuum to reestablish normal vacuum conditions in the control line without dangerously lowering the vacuum in the source and consequently in other units connected thereto.

Other objects and advantages will become apparent during the course of the following description.

In the drawing I have shown one embodiment of the invention. In this showing:

Figure 1 is a diagrammatic view of a tractor-trailer brake system embodying the invention; and Figure 2 is an enlarged detail sectional view through the automatic check valve.

Referring to Figure 1, the numeral 10 designates a brake booster motor preferably of the type shown in the copending application of Jeannot G. Ingres, Serial No. 455,647, filed September 13, 1954. Such booster motor is of the vacuum suspended type and is operable upon the admission of air into one end of the motor to operate a plunger (not shown) to displace hydraulic fluid from a chamber 11 through suitable lines 12 to the brake cylinders 13 of the tractor.

A valve mechanism generally diagrammatically indicated by the numeral 14 is operable for controlling the booster motor 10. This valve mechanism has connection with the atmosphere through an air cleaner 16 and has connection with a source of vacuum through a line 17 tapped into a vacuum supply line 18 leading to a suitable source of vacuum 19. A conventional check valve 20 is preferably arranged in the line 18, and a similar check valve 21 is arranged in the vacuum line 18 between the line 17 and the source 19.

The booster motor valve mechanism is operable by hydraulic fluid displaced through a line 22 from a conventional master cylinder 23 having the usual plunger (not shown) therein operable by a brake pedal 24.

The left end of the motor 10 (Figure 1) to which air is supplied to energize the motor is connected to one end of a control line 26 further described below. The line 26 has a branch 27 leading to the valve mechanism 14 and normally connected to the source of vacuum through the valve mechanism. Since the end of the motor 10 adjacent the valve mechanism is always connected to the source of vacuum, it will be apparent that the motor is vacuum-suspended. It will be apparent that upon operation of the valve mechanism in accordance with the disclosure of the pending application referred to or any similar conventional booster motor, the pipe 27 will be cut off from the vacuum source and air will be admitted to the booster motor to operate the latter.

The vacuum line 18 is connected to a vacuum reservoir 30 on the trailer, the line 18 having the usual connector 31 therein. The reservoir 30 is connected by a pipe 32 to a conventional conversion valve 33 which normally disconnects the pipe from, but is adapted to connect it to, a line 34 connected to the trailer brake operating motors, one such motor being shown in Figure 1 and indicated by the numeral 35. The control line 26 is connected to the conversion valve 33, and the control line is provided therein with a conventional connector 36. In accordance with conventional practice, the admission of air into the lines 27 and 26 to energize the booster motor 10 admits air also to the conversion valve 33 which operates to connect the reservoir 30 to the trailer booster motors 35.

The safety check valve forming the principal subject matter of the present invention is indicated as a whole in Figures 1 and 2 by the numeral 38 and is shown in detail in Figure 2. This valve device comprises a valve body 39 having a chamber 40 therein. In the lower end of the valve body is threaded a plug 41 having a passage 42 therethrough connected at its lower end to the forward end of the control line 26. The upper end of the plug 41, extending into the chamber 40, terminates in a valve seat 43 engageable by a resilient valve 44 carried by a cup 45 urged upwardly by a spring 46. This spring normally maintains the valve 44 open.

The valve body 38 is provided with a laterally extending port 50 in open communication with the chamber 40 and connected to the rear end of the control line 26. Accordingly, the control line is normally open from the booster motor 10 to the conversion valve 33.

The valve body 38 is further provided with an upper port 51 connected to a vacuum line 52 (Figure 1) tapped into the line 18. The port 51 communicates at its lower end with the chamber 40 through a restricted port 53 having a valve seat 54 at its lower end. The valve 44 is molded and extends through an opening centrally of the cup 45 to provide an upper valve 55 normally engaging the seat 54. Opening of the valve 55 under conditions to be referred to admits air into the line 52. This line preferably is connected to the line 18 forwardly of check valves 56, one of which is preferably on the trailer, to prevent admission of air into the reservoir 30.

*Operation*

As previously stated, the valve 44 is normally open to establish an open control line 26 between the booster motor 10 and conversion valve 33. It will become apparent that so long as the system is operating properly and under average conditions, the valve device 38 will function to maintain this open control line.

When the brakes are to be applied, the operator depresses the pedal 24 to displace fluid from the master cylinder 23 through the line 22. This displaced fluid operates the valve mechanism 14 to disconnect the pipe 27 from the source of vacuum and connect it to the atmosphere, thus admitting air into the forward chamber of the booster motor 10 as fully disclosed in the copending application referred to above. Fluid passing through the line 22 also preferably is employed for assisting the booster motor 10 in generating pressure in the tractor wheel cylinders 13.

When air is admitted into the control line 26, pressure will be increased throughout this line, air flowing past valve seat 43 into chamber 40 (Figure 2), thence into the rear end of the control line 26 to operate the conversion valve 33. Thus the vacuum reservoir 30 will be connected to the brake applying motors 35 to apply the trailer brakes. This operation takes place in accordance with conventional practice, the trailer brakes being applied to an extent substantially proportional to the application of the tractor brakes.

Assuming that a rupture occurs in the control line 26 rearwardly of the valve device 38, air would flow through out this line in the absence of the valve 38 to admit air into the booster motor and into the conversion valve 33, thus applying the trailer brakes and rendering the booster motor 10 inoperative. The ends of the motor 10 both communicate with the vacuum source when the pedal 24 is released and the valve mechanism is in normal off position. Hence the breaking of the line 26 rearwardly of the valve 38 would dump air into both ends of the motor and into the vacuum line 17. The valve device 38 prevents this result from occuring. Assuming that a rupture of the character referred to takes place, a pressure rise will occur in the rear end of the line 26 and consequently in the chamber 40, thus establishing substantial air force above the valve 44, whereupon this valve instantly closes. The admission of air into the forward end of the control line 26 is thus prevented, and the booster 10 will not be affected. However, the trailer brakes will be operated and the vehicle combination will be brought to a standstill. Assuming that the line rupture has occurred through a trailer break-away, the closing of the valve 44 leaves the booster motor 10 wholly unaffected. Therefore, the driver continues to have complete control over the tractor brakes and can bring the tractor to a stop. The break-away will have admitted air through the rear end of the line 26 to the conversion valve, hence the trailer brakes will be applied and the trailer thus will be stopped.

The closing of the valve 44 obviously uncovers the port 53, and any air flowing into the ruptured rear end of the line 26 will raise the pressure in the vacuum lines 52 and 18. This will make no difference from the operational standpoint of bringing the vehicles to a stop, however, since there will be adequate vacuum in the reservoir 30 for applying the trailer brakes. Moreover, any substantial rise in pressure in the line 18 will not affect the valve mechanism 14 in view of the use of the check valve 20. Since the motor is vacuum suspended, the operator may increase the rate of deceleration if he desires by depressing the brake pedal to admit air in the normal manner into the forward chamber of the motor 10. It will be noted that in the event of a substantial rupturing of the rear end of the line 26, for example if there is a trailer break-away, the restricted port 53 prevents free flow of air into the line 52. The restriction in such flow does not permit any rapid or substantial lowering of the vacuum in the lines 18 and 52.

The valve 55 and its associated seat 54 have an important function in preserving the normal operation of the system when there is no rupturing of the control line 26. Assuming that the operator depresses the brake pedal to apply the brakes to a substantial extent, a pressure up to atmospheric pressure can be established in the booster motor 10 and throughout the control line 26. If the operator then suddenly and completely releases the brake pedal 24, the line 26 will be rapidly connected to the source of vacuum and there will be a relatively sudden pressure drop in the line 26 forwardly of the valve device 38. Since atmospheric pressure will be present in the rear end of the line 26, the pressure differential on opposite sides of the valve 44 may result in the closing of this valve, and in the absence of the valve 55, air would be trapped in the rear end of the line 26 and normally conditions could not be re-established in the conversion valve 33 to release the brake motors 35.

In the event the valve 44 closes during operating conditions as described above, the valve 55 will open and the rear end of the control line 26 will then have restricted communication with the vacuum pipe 52 through the port 53. Thus air will be bled out of the rear end of the line 26 to re-establish normal vacuum conditions therein. As soon as pressure in such end of the line 26 has dropped to the point where differential pressures affecting the valve 44 will be overcome by the spring 46, the valve 44 will be restored to its normal position shown in Figure 2 and there will be open communication throughout the length of the control line 26. Thus the trapping of atmospheric pressure in the rear end of the line 26 is prevented and proper operation of the trailer brakes in conjunction with the tractor brakes is assured.

The device shown in Figure 2 is extremely simple in construction and economical to manufatcure. It constitutes, however, an important safety contribution to a tractor-trailer brake system of the character described.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a fluid control system, a control line having a first end and a second end, the former of which is subject to controlled variable pressures and normally has vacuum conditions established therein, said second end of said line being connected to a device to be operated in accordance with different pressures, valve means connected between said ends of said control line and normally biased to an open position whereby variations in pressure in said first end of said line will effect similar pressures in said second end of said line to control said device to be operated, said valve means having a pressure responsive portion operable when pressure in said second end of said line substantially suddenly becomes higher than a predetermined value relative to pressure conditions in said first end of said line to close said valve means and maintain vacuum conditions in said first end of said control line, and means operative by said valve means when the latter is closed to connect said second end of said line to a source of vacuum.

2. In a fluid control system, a control line having a first end and a second end, the former of which is subject to controlled variable pressures and normally has vacuum conditions established therein, said second end of said line being connected to a device to be operated in accordance with different pressures, valve means connected between said ends of said control line and normally biased to an open position whereby variations in pressure in said first end of said line will effect similar pressures in said second end of said line to control said device to be operated, said valve means having a pressure responsive portion operable when pressure in said second end of said line substantially suddenly becomes higher than a predetermined value relative to pressure conditions in said first end of said line to close said valve means and maintain vacuum conditions in said first end of said control line, a valve element, and a valve seat normally engaged by said valve element to close communication between said second end of said line and a source of low pressure, said valve element having connection with said valve means to be opened when said valve means is closed.

3. In a fluid control system, a control line having a first end and a second end, the former of which is subject to controlled variable pressures and normally has vacuum conditions established therein, said second end of said line being connected to a device to be operated in accordance with different pressures, and a valve device connected between said ends of said control line, said valve device comprising a chamber connected with one of said ends and a port connected with the other of said ends and provided with a valve seat, a valve normally biased away from said seat to connect said ends of said line whereby changes in pressure in said first end of said line will effect similar pressures in said second end of said line, said valve having a pressure responsive portion subject to a predetermined pressure differential between said first and second ends of said line incident to a predetermined value of pressure in said second end of said line relative to pressure conditions in said first end of said line to close said valve, and means connected to be controlled by said valve to connect said second end of said line to a source of low pressure when said valve is closed.

4. In a fluid control system, a control line having a first end and a second end, the former of which is subject to controlled variable pressures and normally has vacuum conditions established therein, said second end of said line being connected to a device to be operated in accordance with different pressures, and a valve device connected between said ends of said control line, said valve device comprising a chamber connected with one of said ends and a port connected with the other of said ends and provided with a valve seat, a valve normally biased away from said seat to connect said ends of said line whereby changes in pressure in said first end of said line will effect similar pressures in said second end of said line, said valve having a pressure responsive portion subject to a predetermined pressure differential between said first and second ends of said line incident to a predetermined value of pressure in said second end of said line relative to pressure conditions in said first end of said line to close said valve, a vacuum port connected to a source of vacuum, and a second valve normally closing said vacuum port, said second valve being connected to said first-named valve to be opened thereby when said first-named valve is closed to connect said second end of said line of said source.

5. In a fluid control system, a control line having a first end and a second end, the former of which is subject to controlled variable pressures and normally has vacuum conditons established therein, said second end of said line being connected to a device to be operated in accordance with different pressures, and a valve device connected in said control line, said valve device having a chamber communicating with said second end of said line, a pair of valve seats opening into said chamber, one of said seats communicating with said first end of said line and the other seat communicating with a vacuum source, a pair of valves connected for bodily movement with each other and engageable with the respective seats, and biasing means biasing to open position the one valve associated with said one seat, said biasing means normally holding the other valve in closed position, said valves having a differential pressure responsive portion subject to a predetermined pressure differential between said first and second ends of said line incident to a predetermined value of pressure in said second end of said line relative to pressure in said first end of said line to close said one valve and open the other valve to close communication between said ends of said line and open said other seat to said vacuum source.

6. A system in accordance with claim 5 wherein said valve seats face each other in said chamber in coaxial relation whereby axial movement of one valve to close its port bodily moves the other valve to open said other seat.

7. A tractor-trailer brake system comprising a manually controllable tractor brake booster motor of the vacuum suspended type wherein the operation of a valve mechanism admits air into one end of said motor to operate it, a trailer brake motor, a trailer vacuum reservoir, a fluid line connected between said trailer brake motor and said reservoir, a conversion valve connected in said fluid line and operative for determining the connection of said reservoir to said trailer brake motor, a control line connected between said booster motor and said conversion valve to admit air to the latter when air is admitted to said booster motor, and a valve device connected in said control line, said valve device having a normally open valve element affording open communication through said control line and being biased to open position, said valve element having a pressure responsive portion subject to a predetermined pressure differential between said valve device and said conversion valve for closing said valve element, and means subject to operation by said valve element when the latter closes for connecting said control line between said valve device and said conversion valve to a source of vacuum.

8. A system according to claim 7 wherein said means comprises a second valve element connected to said first named valve element and normally engaging a valve seat connected to a source of vacuum.

9. A tractor-trailer brake system comprising a manually controllable tractor brake booster motor of the vacuum suspended type wherein the operation of a valve mechanism admits air into one end of said motor to operate it, a trailer brake motor, a trailer vacuum reservoir, a fluid line connected between said trailer brake motor and said reservoir, a conversion valve connected in said fluid line and operative for determining the connection of said reservoir to said trailer brake motor, a control line connected between said booster motor and said conversion valve to admit air to the latter when air is admitted to said booster motor, and a valve device connected in said control line between said booster motor and said conversion valve, said valve device comprising a chamber communicating through said control line with said conversion valve, a valve seat communicating through said control line with said booster motor, a valve engageable with said seat, biasing means normally holding said valve open whereby communication through said control line is open from said booster motor to said conversion valve, said valve having a pressure responsive portion subject to a predetermined pressure differential in said control line between said valve device and said conversion valve to close said valve against said biasing means, and means operative when said valve is closed for connecting said chamber to a source of vacuum.

10. A system according to claim 9 wherein said last-named means comprises a second valve movable with said first-named valve and biased by said biasing means to a closed position engaging a valve seat communicating with a source of vacuum and adapted to be opened to said chamber when said first-named valve is closed.

11. A tractor-trailer brake system comprising a manually controllable tractor brake booster motor of the vacuum suspended type wherein the operation of a valve mechanism admits air into one end of said motor to operate it, a trailer brake motor, a trailer vacuum reservoir, a fluid line connected between said trailer brake motor and said reservoir, a conversion valve connected in said fluid line and operative for determining the connection of said reservoir to said trailer brake motor, a control line connected between said booster motor and said conversion valve to admit air to the latter when air is admitted to said booster motor, and a valve device connected in said control line between said booster motor and said conversion valve, said valve device comprising a body having a chamber therein in open communication with the end of said control line leading to said conversion valve, a valve seat in said chamber in open communication with the end of said control line leading to said booster motor, a first valve in said chamber engageable with said seat, means normally biasing said first valve to open position, said first valve including a pressure responsive portion subject to a predetermined pressure differential between said chamber and said control line between said valve device and said booster motor to seat said first valve against the force of said biasing means and a second valve connected to said first valve and biased by said biasing means to closed position, said second valve being opened when said first valve is closed to connect said chamber to a source of vacuum.

12. A system according to claim 11 wherein said valves are coaxial, and a second valve seat coaxial with said first valve seat and normally engaged by said second valve, said second valve seat having a restricted port communicating with a source of vacuum.

13. A tractor-trailer brake system comprising a vacuum source on the tractor, a manually controllable tractor brake booster motor of the vacuum suspended type wherein a valve mechanism normally connects one end of said motor to said source and wherein operation of said valve mechanism disconnects such end of said motor from the atmosphere and connects it to said source, a trailer brake motor, a trailer vacuum reservoir, a vacuum supply line connected between said source and said reservoir, a fluid line connected between said trailer brake motor and said reservoir, a conversion valve connected in said fluid line for determining the connection of said reservoir to said trailer brake motor, a control line connected between said booster motor and said conversion valve to admit air to the latter when air is admitted to said end of said booster motor, and a valve device connected in said control line on the tractor, said valve device having a normally open valve element affording open communication through said control line and being biased to open position, said valve element having a pressure responsive portion subject to a predetermined pressure differential in said control line between said valve device and said conversion valve for closing said valve element, and means affording restricted communication between said vacuum supply line and said control line between said valve device and said conversion valve when said valve element closes.

14. A system according to claim 13 wherein said valve device comprises a housing having a valve seat therein communicating with said vacuum supply line, said means comprising a second valve element connected to be operated by said first-named valve element and normally engaging said valve seat, said housing being provided with a restricted port through which said valve seat communicates with said vacuum supply line to limit the flow of air through said valve seat.

References Cited in the file of this patent

UNITED STATES PATENTS 2,703,631    Hupp   ---------------- Mar. 8, 1955
2,718,897    Andrews   -------------- Sept. 27, 1955